United States Patent
Chibon et al.

(10) Patent No.: US 12,476,944 B2
(45) Date of Patent: *Nov. 18, 2025

(54) ZONED MESH NETWORK ISOLATION

(71) Applicant: Red Hat, Inc., Raleigh, NC (US)

(72) Inventors: Pierre-Yves Chibon, Saint-Pol-de-Leon (FR); Leigh Griffin, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 182 days.

This patent is subject to a terminal disclaimer.

(21) Appl. No.: 18/304,133

(22) Filed: Apr. 20, 2023

(65) Prior Publication Data
US 2024/0356902 A1    Oct. 24, 2024

Related U.S. Application Data

(63) Continuation of application No. 17/703,249, filed on Mar. 24, 2022, now Pat. No. 11,652,696.

(51) Int. Cl.
*H04L 9/40* (2022.01)

(52) U.S. Cl.
CPC .......... *H04L 63/0428* (2013.01); *H04L 63/20* (2013.01)

(58) Field of Classification Search
CPC .......................... H04L 63/0428; H04L 63/20
USPC .............................................................. 726/1
See application file for complete search history.

(56) References Cited

U.S. PATENT DOCUMENTS

| | | | |
|---|---|---|---|
| 7,934,253 B2 * | 4/2011 | Overcash | G06F 21/55 726/25 |
| 8,701,156 B1 * | 4/2014 | Agrawal | H04L 63/20 726/28 |
| 8,819,772 B2 * | 8/2014 | Bettini | H04L 63/1433 709/227 |
| 9,565,192 B2 | 2/2017 | Chillappa et al. | |
| 9,949,130 B2 | 4/2018 | Ophir et al. | |
| 10,243,999 B2 | 3/2019 | Mahaffey et al. | |
| 10,567,434 B1 * | 2/2020 | Sharifi Mehr | H04L 63/0428 |
| 10,826,918 B1 | 11/2020 | Rasovic | |
| 10,999,738 B2 | 5/2021 | Patil et al. | |
| 11,025,627 B2 | 6/2021 | Li et al. | |
| 2011/0019587 A1 * | 1/2011 | Wang | H04L 63/08 370/254 |
| 2011/0264919 A1 * | 10/2011 | Pizano | H04L 9/0816 713/186 |

(Continued)

OTHER PUBLICATIONS

Pietschmann, Chris, "IoT Security Architecture: Trust Zones and Boundaries", Dec. 20, 2018, 15 pages.
Butun, Ismail, et al.; "Security of the Internet of Things: Vulnerabilities, Attacks and Countermeasures", Oct. 29, 2019, 25 pages.

(Continued)

*Primary Examiner* — Dant B Shaifer Harriman
(74) *Attorney, Agent, or Firm* — Womble Bond Dickinson (US) LLP

(57) ABSTRACT

Embodiments of the present disclosure include a processing device that determines that a first node device of a plurality of node devices in a network is non-compliant with a network policy, identifies a first subset of the plurality of node devices that are not associated with the first node device, and transmits a communication to the first subset of the plurality of node devices that instructs respective ones of the first subset of the plurality of node devices to perform an alteration of a state of a communication path of the first subset of the plurality of node devices to be incompatible with the first node device.

17 Claims, 5 Drawing Sheets

(56) References Cited

U.S. PATENT DOCUMENTS

2016/0330233 A1* 11/2016 Hart ........................ H04L 63/20
2018/0123804 A1    5/2018 Smith et al.
2020/0169572 A1    5/2020 Jana et al.
2020/0374700 A1   11/2020 Smith et al.

OTHER PUBLICATIONS

Madan, Akshay; "Intrusive-Node Detection and Smart Redundancy in Networks", 2020, 18 pages.

* cited by examiner

ZONED MESH NETWORK ISOLATION

CROSS REFERENCE TO RELATED APPLICATION

This application is a continuation of U.S. application Ser. No. 17/703,249, filed Mar. 24, 2022, the entire contents of which are incorporated by reference herein.

TECHNICAL FIELD

Aspects of the present disclosure relate to networked devices, and more particularly, to security detection and mitigation with respect to client devices of a mesh network.

BACKGROUND

A mesh network is a network topology that includes nodes (i.e. bridges, switches, internet-of-things (IoT) devices, and other infrastructure devices) that are interconnected directly and non-hierarchically to other nodes and interact to communicate within the mesh. The interconnected format of the nodes allows for multiple nodes to participate in the relay of information.

Mesh networks may be formed from multiple types of devices and different devices may provide different services within the mesh network. In some cases, the client devices within the mesh network may be connected in an ad hoc fashion, with communication within the mesh network being provided, in part, in a decentralized fashion.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
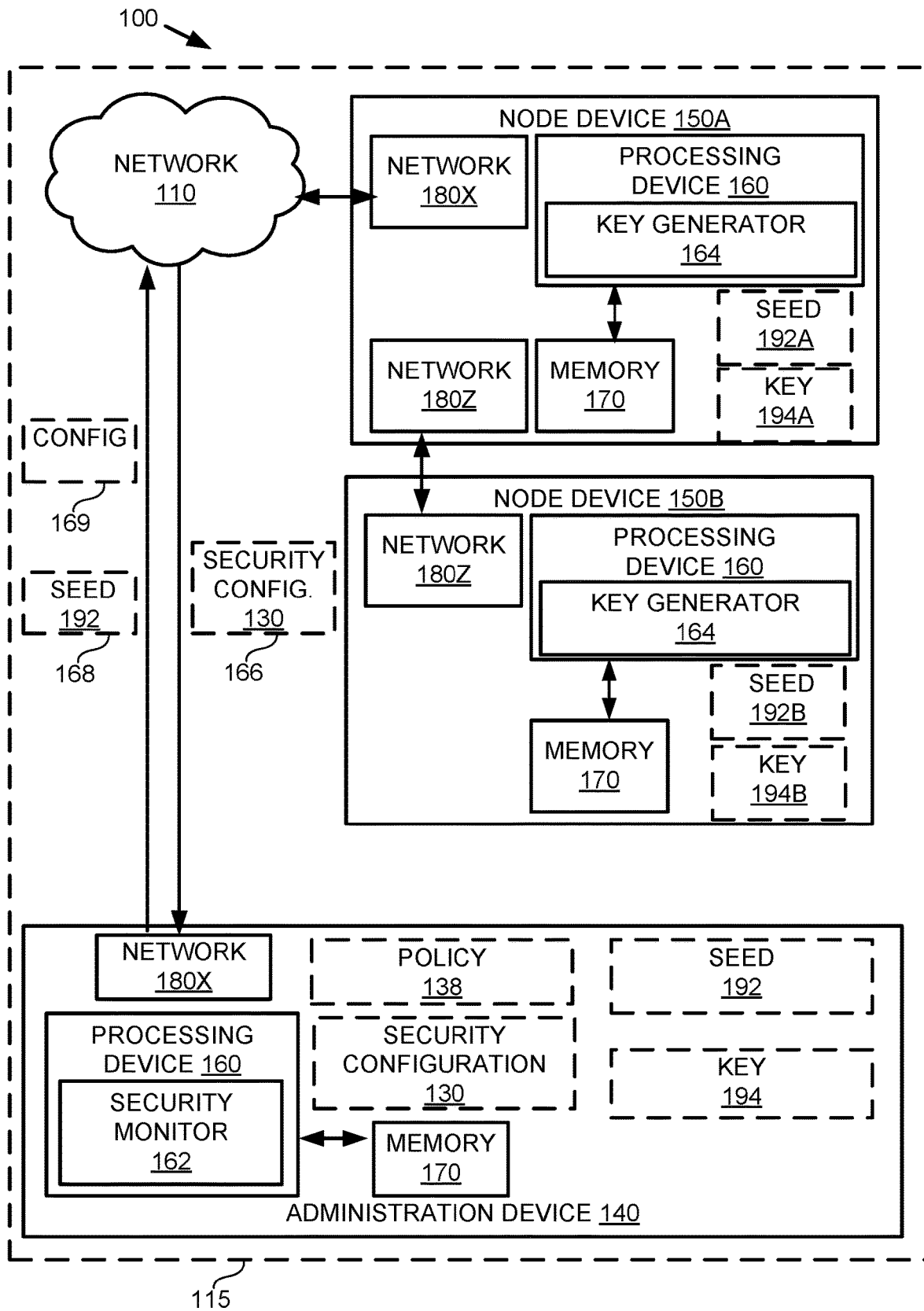
FIG. 1 is a block diagram that illustrates an example of a network architecture, in accordance with one or more aspects of the present disclosure.

Internet-of-things (IoT) devices have become increasingly ubiquitous and, as a result, various solutions have been proposed to communicate with and between large networks of IoT devices. IoT devices can have various types of software and/or hardware configurations. By networking the IoT devices together, functionalities performed by one of the IoT devices may be provided as a service to other IoT devices that lack that functionality. For example, some IoT devices may have a particular type of processing functionality (such as authentication or password management) that may be provided to other IoT devices in the network.

In a conventional IoT network, when the IoT network grows in size, managing each device quickly becomes a challenging task. The proper configuration of the IoT devices may be needed to provide not only that the right software is installed, but that the ongoing security and/or intrusion detection of each of the node be continuously maintained. Managing hundreds or thousands of node devices (which may be, for example, a networked computing device) raises challenges of scalability as well as flexibility.

For example, due to the interconnected nature of the node devices in the mesh network, a weakness on one node device may open up the entire, or a majority, of the mesh network to vulnerabilities. The number of node devices in the mesh network, as well as the decentralized nature of the mesh network, may make the task of ensuring compliance on all of the nodes more complex. In addition, the complexity of the interconnections between the devices of the mesh network may further complicate the ability to minimize and/or reduce the damage done within the mesh network when or if a particular node device gets compromised. For example, once a given node device is compromised, it may be difficult in a conventional network to keep the damage confined to as few devices as possible. This can be particularly complex in mesh networks where the network connections are not necessarily hierarchical and the network topology may change over time in unexpected ways.

Aspects of the disclosure address the above-noted and other deficiencies by providing a mesh network architecture that isolates a particular attack vector to one of a plurality of zones. In some embodiments, once a compromised node device is discovered within the network, a subset of the network is identified that includes one or more client devices associated with the compromised node device. The subset of the network may include node devices that are physically proximate (e.g., within a particular geographic distance) or logically proximate (e.g., within one or more network connections) to the compromised node device.

Once the subset of node devices has been identified, communication between the subset of node devices and the rest of the network architecture may be disrupted (e.g., to reduce a potential attack surface associated with the compromised node device). For example, the ability for other members of the network to communicate with the subset of the node devices may be restricted and/or reduced. By restricting the access to and from the subset of node devices, a spread of a potential attack (e.g., associated with the compromised node device) may be slowed and/or stopped. As used herein, the term "and/or" includes any and all combinations of one or more of the associated listed items.

In some embodiments, the isolation of the subset of node devices from the rest of the network may be accomplished through the use of cryptographic means. For example, in some embodiments, communication within the mesh network may be accomplished through the use of cryptographic keys used to encrypt network communications between various node devices of the mesh network. Subsets of the network that are associated with a compromised (or potentially compromised) node device, may be isolated by rotating the cryptographic keys used within the network without informing the subset of the node devices of the change. As a result, the subset of the node devices may be unable to decrypt the network traffic to which they are connected, and other node devices of the network can recognize the use of expired cryptographic keys by the subset of node devices. As a result, the suspected subset of the node devices can be isolated relatively quickly in a way that does not require participation from the suspected subset of node devices. In some embodiments, management nodes of the network may subsequently interact with ones of the subset of node devices using specialized network communication (e.g., using the expired cryptographic keys or other means).

FIG. 1 depicts a high-level component diagram of an illustrative example of a mesh network architecture 100, in accordance with one or more aspects of the present disclosure. However, although the discussion with respect to FIG. 1 describes a mesh network, other network architectures (e.g., non-mesh) are possible without deviating from the scope of the present disclosure, and the implementation of a computer system utilizing examples of the disclosure are not necessarily limited to the specific architecture depicted by FIG. 1.

As shown in FIG. 1, mesh network architecture 100 includes a plurality of computing devices, including an administration device 140 and a plurality of node devices 150. For convenience of description, only two node devices 150, a first node device 150A and a second node device 150B, are illustrated, but it will be understood that additional node devices 150 may be present without deviating from the scope of the present disclosure.

FIG. 1 and the other figures may use like reference numerals to identify like elements. A letter after a reference numeral, such as "150A," indicates that the text refers specifically to the element having that particular reference numeral. A reference numeral in the text without a following letter, such as "150," refers to any or all of the elements in the figures bearing that reference numeral.

The administration device 140 and node devices 150 include one or more processing devices 160, memory 170, which may include volatile memory devices (e.g., random access memory (RAM)), non-volatile memory devices (e.g., flash memory) and/or other types of memory devices, and one or more network interfaces 180. In certain implementations, memory 170 may be non-uniform access (NUMA), such that memory access time depends on the memory location relative to processing device 160. It should be noted that although, for simplicity, a single processing device 160 is depicted in each of the administration device 140 and node devices 150 depicted in FIG. 1, other embodiments of the administration device 140 and node devices 150 may include multiple processing devices, storage devices, or other devices.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the administration device 140 and node devices 150 may have different types of processing device 160.

The administration device 140 and node devices 150 may be a server, a mainframe, a workstation, a personal computer (PC), a mobile phone, a palm-sized computing device, a virtual instance of a computing device, etc. In some embodiments, one or more of the administration device 140 and node devices 150 may be an IoT device. In some embodiments, one or more of the administration device 140 and node devices 150 may be a nanotech device. In some embodiments, nanotech devices may have a longest dimension that is less than 100 nm. For clarity, some components of the administration device 140 and node devices 150 are not shown.

In some embodiments, the administration device 140 and the node devices 150 may be directly or indirectly communicatively coupled through one or more of the network interfaces 180. For example, the administration device 140 and one or more of the node devices 150 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the administration device 140 and one more of the node devices 150.

The administration device 140 and the node devices 150 may include a plurality of network interfaces 180. The network interfaces 180 may communicate with a plurality of network types. The variety of network interfaces 180 may allow for various configurations of network connectivity between the administration device 140 and the node devices 150.

For example, administration device 140 may include a first network interface 180X. The first network interface 180X may communicate with and/or within the network 110. A first node device of the node devices 150, e.g., first node device 150A, may also include the first network interface 180X. Thus, the first node device 150A may be capable of communicating with the administration device 140 over network 110 using the first network interface 180X.

A second node device of the node devices 150, e.g., second node device 150B, may not include the first network interface 180X. Thus, the second node device 150B may not be capable of directly communicating over network 110. Instead, the second node device 150B may be communicatively coupled to the network 110 through a second network interface 180Z that is coupled to the first node device 150A (e.g., as a point-to-point connection). That is to say that the first node device 150A may serve as a relay for communications between the second node device 150B and the network 110. For example, the second node device 150B may be capable of communicating with the administration device 140 through the second network interface 180Z between the first and second node devices 150A, 150B and through the first network interface 180X between the first node device 150A and the administration device 140 (over network 110). In some embodiments, the first and/or second network interface 180X, 180Z may include a wireless technology, such as WIFI®, Bluetooth, Home radio frequency (Home RF), to name a few examples.

The administration device 140, the first node device 150A, the second node device 150B, and the network connections therebetween may form the mesh network 115.

The mesh network 115 may provide an interconnected and non-hierarchical network between members of the mesh. Devices (e.g., node devices 150) may join or leave the mesh network 115, and communication between members of the mesh over various network connections of the mesh may be dynamically routed responsive to changes in the mesh configuration.

The node devices 150 may perform one or more services within the mesh network 115. As used herein, a "service" provided by the node device 150 refers to a task or other technical activity performed by the node device 150 on behalf of or for another node device 150 or other device external to the mesh network 115. A service may include computer program logic utilized to provide the specified task or technical activity. Thus, a service can be implemented in hardware, firmware, and/or software. In one embodiment, services are stored on a non-transitory storage device (i.e., a computer program product), loaded into a memory, and executed by one or more processing devices. In some embodiments, the service may be provided by execution of computer instruction code on processing device 160. Examples of services include, but are not limited to, an authentication service, a storage service, a gateway service, a processing service, a power management service, a web server service, and/or a packaging service. The above examples of services are merely examples, and are not intended to limit the present disclosure. One of ordinary skill in the art will recognize that other types of services may be provided within the mesh network 115 without deviating from embodiments of the present disclosure.

In some embodiments, communications on the mesh network 115 may be encrypted. For example, network data may be encrypted prior to transmission through the mesh network 115 in a manner that is well known in the art. For example, a pre-defined scheme may be used to encrypt data at a first node device 150A using a first security key 194A. The data may be transmitted to a second node device 150B where it is decrypted using a second security key 194B. In some embodiments, each of the node device 150 may share a same key 194. In some embodiments, the keys 194 used to decrypt a network transmission may be complementary to the key 194 used to encrypt the network transmission. There are many methods for producing and exchanging the keys which are well known to those of skill in the art. One such encryption method is known as RSA, which is a public key encryption system widely used in electronic commercial protocols as disclosed in U.S. Pat. No. 4,405,829 by Rivest et al. and hereby incorporated by reference herein.

In some embodiments, the key 194 may be generated using a key generator 164 provided with a seed 192. The key generator 164 may be configured such that when provided with a same seed 192, a same key 194 is generated. In some embodiments, the initial seed 192 may be used to generate a first key 194. The first key 194 may be used by the key generator 164 to generate a second key 194, and so on. Thus, given an initial seed 192, a series of keys 194 may be generated by the key generator 164 deterministically given the initial seed 192. This is only one method of generating a series of keys 194 deterministically, and other methods may be utilized without deviating from the embodiments of the present disclosure.

In some embodiments, the administration device 140 may provide the node devices 150 with the seed 192. For example, in some embodiments, the administration device 140 may provide a transmission 168 on the network 110 to one or more of the node devices 150. The transmission 168 may contain the seed 192 or a mechanism by which the seed 192 may be generated. The key generator 164 of the first node device 150A uses a first copy of the seed 192A to generate a first key 194A. The key generator 164 of the second node device 150B uses a second copy of the seed 192B to generate a second key 194B. Since the first and second node devices 150A, 150B share a copy of the seed 192, the first and second security keys 194A, 194B may be compatible such that the first and second node devices 150A, 150B may be capable of encrypting and decrypting communications between one another.

Though the key 194 has been described as a single entity, it will be understood that the key 194 may actually be a plurality of keys 194. For example, the key 194 may, in some embodiments, include a public/private key pair. In some embodiments, the key 194 may include a key for encrypting communications and a key for decrypting communications. As used herein, the key 194 refers to a mechanism by which a node device 150 can encrypt and decrypt communications with other node devices 150.

In some embodiments, the key 194 can be changed. For example, in some embodiments, the administration device 140 may send a configuration transmission 169 to one or more of the node devices 150. The configuration transmission 169 may include instructions for iterating the key 194. As described herein, the node devices 150 may utilize the seed 192 to deterministically generate a new key 194 using key generator 164. The configuration transmission 169 may instruct the node devices 150 to generate a new key 194 (e.g., from the previous key 194, from the seed 192, or through other deterministic means). For each of the node devices 150 receiving the configuration transmission 169 and having the same seed 192, the key generator 164 will generate a compatible key 194 (e.g., a same key 194) in response to the configuration transmission 169. Thus, each of the node devices 150 receiving the configuration transmission 169 will still be able to encrypt and decrypt transmissions between one another due to having a same and/or compatible key 194. It will be understood that those of the node devices 150 that did not receive the configuration transmission 169 and/or did not regenerate the key 194 will now be unable to encrypt/decrypt network transmissions from those of the node devices 150 that regenerated their keys 194. Thus, the administration device 140 can control who may communicate with one another on the network 110 and disrupt communications by and/or to particular node devices 150 by selectively transmitting the configuration transmission 169 to particular node devices 150.

Though FIG. 1 illustrates the generation of a new key 194 being responsive to a configuration transmission 169, it will be understood that the embodiments of the present disclosure are not limited to such a configuration. In some embodiments, the node devices 150 may generate a new key 194 in response to some other signal. In some embodiments, the administration device 140 may transmit new seeds 192 to the node devices 150 to cause the generation of new keys 194.

Though FIG. 1 illustrates the seed 192 being transmitted to the node devices 150 by the administration device 140, this is merely an example and the embodiments of the present disclosure are not limited thereto. In some embodiments, the seed 192 may be preloaded on the node device 150, or may be provided utilizing other mechanisms known to those of ordinary skill in the art.

A security monitor 162 of the administration device 140 may keep track of a security configuration 130 of each of the node devices 150. The security configuration 130 may include multiple characteristics for each of the node devices

150. For example, the security configuration 130 may include information on the node devices including, but not limited to, software inventory (e.g., what software is installed, as well as the versions thereof, etc.), performance information, hardware inventory (e.g., hardware that is installed on the node device 150 and a status thereof, etc.), security information (e.g., passwords, password policies, account information, etc.), and/or configuration information (e.g., how the software and/or hardware for the node device 150 are configured).

The hardware inventory of the node devices 150 provided in the security configuration 130 may include, for example, a number of processors on or accessible by the node device 150, an amount of memory on or accessible by the node device 150, an amount of storage on or accessible by the node device 150, a number and type of network interfaces on or accessible by the node device 150, sensors on or accessible by the node device 150, a physical location of the node device 150 (e.g., as determined by a GPS sensor), a network location of the node device 150 (e.g., an IP address) etc.

The performance information of the node devices 150 provided in the security configuration 130 may include, for example, a processing load being processed by the node device 150, an amount of free memory and/or storage on the node device 150, a network capacity of the node device 150, etc.

The software inventory of the node devices 150 provided in the security configuration 130 may include, for each node device 150, one or more services being provided within the mesh network 115. It will be understood that not all node devices 150 may be executing a service within the mesh network 115. Some node devices 150 may instead be unconfigured (or performing other tasks) rather than providing a service. The software inventory may also include version information for the installed software of the node device 150.

The configuration information of the node devices 150 provided in the security configuration 130 may include information about how the software and/or hardware of the node devices 150 are configured to operate. For example, the configuration information may include information regarding which options are enabled for particular software applications, what features of a hardware element of the node device 150 are enabled and/or configured. For example, the configuration information may indicate which network options have been enabled and the number and configuration of the open network ports.

The security information of the node devices 150 provided in the security configuration 130 may include information about security and/or access control that is implemented on the node device 150. For example, the security information may include information regarding user accounts, including user identifications. In some embodiments, the security information may include password information, as well as configuration options for security on the node device 150. For example, the security information may indicate whether default passwords are being used by any of the user accounts of the node device 150. As another example, the security information may include configuration options for the passwords, including a required password length, minimum time to replace a password, and the like.

In some embodiments, the security configuration 130 for each of the node devices 150 may be received as a transmission 166 from each of the node devices 150 to the administration device 140, though the embodiments of the present disclosure are not limited thereto. In some embodiments, the administration device 140 may poll each of the network devices 150 for their security configuration 130. In some embodiments, the administration device 140 may directly access (e.g., log into) each of the network devices 150 to retrieve their security configuration 130. In some embodiments, the security configuration 130 may be provided on a regular basis (e.g., on a regular interval) and/or when an updated security configuration 130 is available on the node device 150 (e.g., event-driven). In some embodiments, the security configuration 130 for a particular node device 150 may be determined by the administration device 140. For example, the administration device 140 may determine whether particular network ports are accessible on a node device 150 by performing a network scan of the node device 150 and recording the results.

The security monitor 162 of the administration device 140 may analyze the received security configuration 130 from each of the node devices 150 for compliance with policy 138 (e.g., network policy and/or security policy). The administration device 140 may determine if one or more of the node devices 150 is non-compliant with respect to the policy 138. Examples of non-compliance include, but are not limited to, a version of software on the node device 150 that is older than a defined level or is associated with a known security vulnerability, the use of default passwords on the node device 150, the presence of a login and/or password that has been identified as having been leaked (e.g., known to be a part of a leaked set of password information), vulnerabilities with respect to network configuration of the node device 150 (e.g., a network port that is exposed and/or unsecured), the presence of unapproved software, the type or configuration of a virus scanner (or lack thereof), misconfigured software and/or hardware, unrecognized user credentials, and/or missing/unconfigured encryption. It will be understood that these are merely examples, and that other types of software and/or hardware vulnerabilities may be tracked against policy 138 without deviating from the embodiments of the present disclosure.

Figure 2:
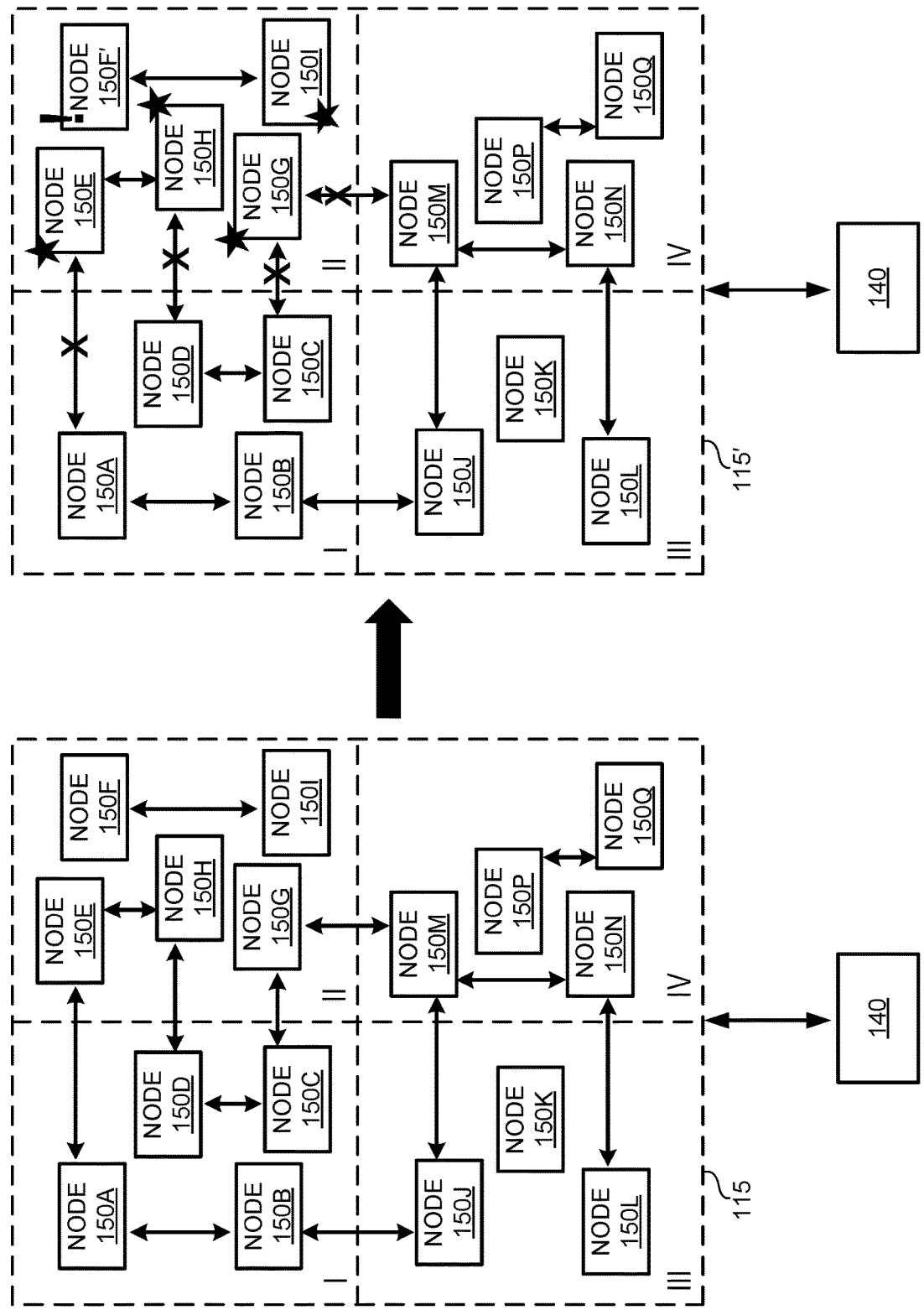
FIG. 2 is a schematic diagram illustrating an example scenario of a selection of a subset of node devices based on proximity and/or location, in accordance with one or more aspects of the present disclosure.
Figure 3:
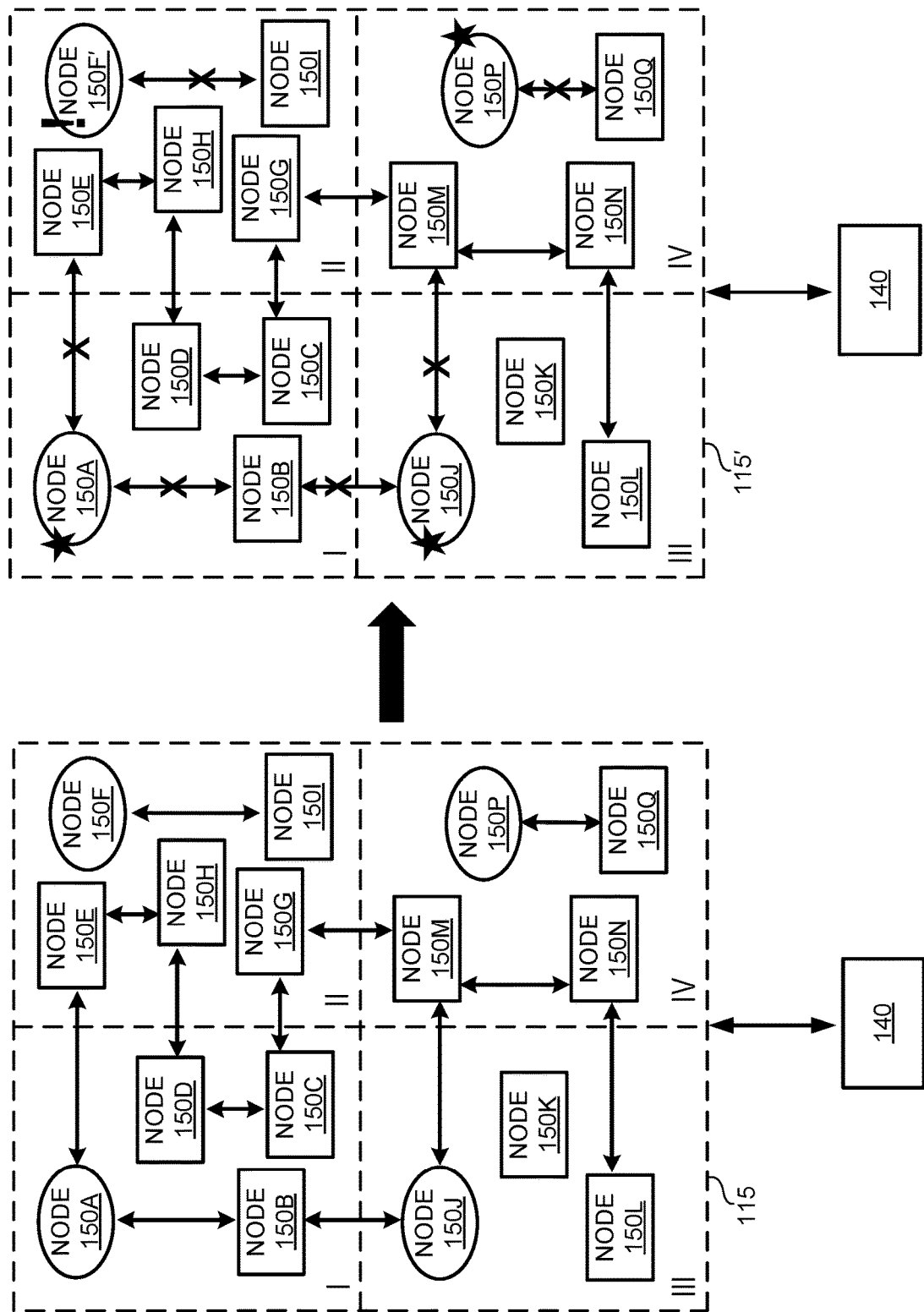
FIG. 3 is a schematic diagram illustrating an example scenario of a selection of a subset of node devices based on a common feature, in accordance with one or more aspects of the present disclosure.

When a node device 150 is determined to be non-compliant with respect to the policy 138, the administration device 140 may disrupt a communication path of the node device 150 within the mesh network 115, as will be described further herein. In addition, the administration device 140 may disrupt communication of a subset of the node devices 150 that are associated with the non-compliant node device 150. In some embodiments, the subset of the node devices 150 may be selected based on their geographic proximity and/or network proximity to the non-compliant node device 150. In some embodiments, the subset of the node devices 150 may be selected based on a similarity of a service provided by the node devices 150. FIGS. 2 and 3 provide examples of these configurations.

FIG. 2 is a schematic diagram illustrating an example scenario of a selection of a subset of node devices 150 based on proximity and/or location, in accordance with one or more aspects of the present disclosure. In FIG. 2, an administration device 140 is illustrated in communication with a mesh network 115. The mesh network 115 may be organized in a plurality of zones, which are illustrated schematically as zones I, II, III, and IV in FIG. 2. The number and placement of the zones I-IV in FIG. 2 are merely an example, and more or fewer zones may be provided without deviating from the embodiments of the present disclosure. In addition, the zones I-IV are illustrated as having a uniform shape in FIG. 2. This is merely an example, and zones I-IV of different sizes may be present without deviation from the embodiments of the present disclosure. FIG. 2 illustrates, in part, a transition of the network from a first mesh network configuration 115 to a second mesh network 115' in response to changes within the node devices 150.

Referring to FIGS. 1 and 2, a plurality of node devices 150 may be interconnected and/or grouped within the zones I-IV of the mesh network 115. For example, as illustrated in FIG. 2, a first zone I may include node devices 150A, 150B, 150C, and 150D. A second zone II may include node devices 150E, 150F, 150G, 150H, and 150I. A third zone III may include node devices 150J, 150K, and 150L. A fourth zone IV may include node devices 150M, 150N, 150P, and 150Q. The zones I-IV may represent a physical grouping of node devices 150 (e.g., within a particular geographic area or within a certain proximity to one another) or a logical grouping of node devices 150 (e.g., node devices 150 performing a particular function or other categorization).

As described herein, the plurality of node devices 150 may be coupled directly and/or indirectly within the mesh network 115. The plurality of node devices 150 may each include one or more network interfaces (e.g., network interfaces 180 in FIG. 1). In FIG. 2, one or more of the node devices 150 may be running a service, such as a web server service.

In some embodiments, the administration device 140 may execute a security monitor 162 (see FIG. 1) that monitors and maintains a security configuration 130 of the node devices 150 against a policy 138 (see FIG. 1). In some embodiments, the policy 138 may apply to the entire mesh network 115 and/or one or more of the zones I-IV.

If the administration device 140 determines that the mesh network 115 and/or one or more of the zones I-IV of the mesh network 115 does not match the policy 138, a configuration transmission 169 (see FIG. 1) may be sent to one or more of the node devices 150 in the mesh network 115 to disrupt a communication path of the node devices 150, as described herein.

In some embodiments, if a particular node device 150 of the mesh network 115 is determined to be non-compliant with respect to the policy 138 (described hereafter as a "non-compliant node device" 150'), the administration device 140 may select of plurality of the node devices 150 to be excised from the communication of the mesh network 115. In some embodiments, in addition to the node device 150 found to be non-compliant, the administration device 140 may also select the other node devices 150 of the particular zone to be removed from the network (e.g., have their network communications disrupted).

In some embodiments, the zone may include a plurality of node devices 150 that are within a particular physical distance from the non-compliant node device 150'. In some embodiments, the zone may include a plurality of node devices 150 that are within a particular logical distance from the non-compliant node device 150'. For example, the zone may include the node devices 150 that are within a threshold number of network connections (e.g., one network hop away, or two network hops away) from the non-compliant node device 150'. Other definitions of these groups may be used without deviating from the embodiments of the present disclosure. Thus, a subset of the plurality of node devices 150 may be selected based on a relationship the node devices 150 have with the non-compliant node device 150'. Though the zones I-IV are illustrated statically in FIG. 2, it will be understood that this is merely an example. In some embodiments, the zones may be dynamically created, and may be defined based on a relationship to the non-compliant node device 150'.

Once the administration device 140 has detected a non-compliant node device 150' and a subset of the node devices 150 that are associated with the non-compliant node device 150', the administration device 140 may disrupt communications between the remaining node devices 150 of the mesh network 115 and the non-compliant node device 150' and the subset of the node devices 150 that are associated with the non-compliant node device 150' to form the second mesh network 115'.

For example, referring to FIG. 2, the administration device 140 may recognize that the node device 150F in zone II is non-compliant with respect to policy 138. Thus, the node device 150 may become the non-compliant node device 150F', as identified by an exclamation mark ('!') in FIG. 2.

The administration device 140 may further determine a subset of the node devices 150 that are associated with the non-compliant node device 150F'. For example, the administration device 140 may identify that the additional node devices 150 in zone II are associated with the non-compliant node device 150F' based on their physical and/or logical proximity to the non-compliant node device 150F'. The administration device may thus identify node devices 150E, 150H, 150G, and 150I as a subset of the node devices 150 that are associated with the non-compliant node device 150F'. In FIG. 2, the subset of the node devices 150 that are associated with the non-compliant node device 150F' are identified by a star.

The administration device 140 proceed to disrupt the communication of the non-compliant node device 150F' and the subset of node devices 150 associated with the non-compliant node device 150F'. For example, the administration device 140 may prevent the non-compliant node device 150F' and the subset of node devices 150 associated with the non-compliant node device 150F' from communicating with the other remaining node devices 150 of the mesh network 115'.

For example, referring to FIG. 2, the administration device 140 may block communication between node device 150E and node device 150A of zone 1, communication between node device 150H and node device 150D of Zone 1, and/or communication between node device 150G and node devices 150C of zone I and 150M of zone IV. It should be noted that the configuration of the various node devices 150 and communication paths illustrated in FIG. 2 are merely an example to aid in understanding the inventive concept.

As illustrated in FIG. 2, the non-compliant node device 150F' and the subset of node devices 150 associated with the non-compliant node device 150F' may be restricted from communicating with other node devices 150 in other zones (e.g., those node devices 150 not associated with the non-compliant node device 150F'). It should be noted, as also illustrated in FIG. 2, that communications between the non-compliant node device 150F' and the subset of node devices 150 associated with the non-compliant node device 150F' may not necessarily be affected. That is to say that the non-compliant node device 150F' and the subset of node devices 150 associated with the non-compliant node device 150F' may continue to communicate with one another, though the embodiments of the present disclosure are not limited to such a configuration.

By isolating the non-compliant node device 150F' and the subset of node devices 150 associated with the non-compliant node device 150F', the administration device 140 may attempt to limit damage to the mesh network 115 caused by the non-compliant node device 150F'. The selection of the subset of node devices 150 associated with the non-compliant node device 150F' may be performed as an attempt to quarantine those node devices 150 that may have been infected and/or impacted by the non-compliant node device 150F'. Thus, according to some embodiments of the present disclosure, node devices 150 that have not yet been indicated as being compromised may still be isolated within the second (updated) mesh network 115'.

Though FIG. 2 illustrates an embodiment in which a subset of node devices 150 are associated with a non-compliant node device 150' based on their logical and/or physical proximity to the non-compliant node device 150', this is merely an example, and the embodiments of the present disclosure are not limited thereto. For example, FIG. 3 is a schematic diagram illustrating an example scenario of a selection of a subset of node devices 150 based on a common feature, in accordance with one or more aspects of the present disclosure.

In FIG. 3, an administration device 140 is illustrated in communication with a mesh network 115 including a plurality of node devices 150. This is merely an example configuration and is not intended to limit the embodiments of the present disclosure. In FIG. 3, one or more of the node devices 150 may have a common feature. For example, one or more of the node device 150 may be providing a same or similar particular service (e.g., providing a web server), may have a particular hardware feature, may have a same software version of a particular software package, or the like. In FIG. 3, different shapes for the node devices 150 are utilized to illustrate different features. In FIG. 3, node devices 150 having the common feature are illustrated as an oval. This arrangement of the node devices 150 is merely schematic and is not intended to limit the embodiments of the present disclosure. FIG. 3 illustrates, in part, a transition of the network from a first mesh network configuration 115 to a second mesh network 115' in response to changes within the node devices 150.

Referring to FIGS. 1 and 3, the administration device 140 may monitor the mesh network 115 to determine compliance with the policy 138. The mesh network 115 may be configured similarly to that of FIG. 2 and thus a description of the node devices 150 of the mesh network 115 are omitted for brevity.

The administration device 140 may detect that a node device 150 is non-compliant with the policy 138. In FIG. 3, an exclamation point (!) is indicated next to the non-compliant node device 150F' to indicate that the non-compliant node device 150F' has been identified by the administration device 140 as being non-compliant. As discussed herein, the non-compliance may be due to a down-level software version, misconfigured passwords, open network ports, or the like.

In some embodiments, in addition to the node device 150 found to be non-compliant, the administration device 140 may also select the other node devices 150 sharing the common feature with the non-compliant node device 150F'. For example, if the non-compliant node device 150F', additional node devices 150 that are also providing a web server as a service may also be selected. If the non-compliant node device 150F' was selected because a particular version of a software package installed thereon, additional node devices 150 having that same software package at that same version level may also be selected and associated with the non-compliant node device 150F'. In FIG. 3, it is illustrated that node devices 150A, 150J, and 150P share the common feature with node device 150F, and are thus selected as a subset of the node devices 150 that are associated with the non-compliant node device 150F'. In FIG. 3, the subset of the node devices 150 that are associated with the non-compliant node device 150F' are identified by a star.

Once the administration device 140 has detected a non-compliant node device 150F' and a subset of the node devices 150 that are associated with the non-compliant node device 150', the administration device 140 may disrupt communications between the remaining node devices 150 of the mesh network 115 and the non-compliant node device 150F' and the subset of the node devices 150 that are associated with the non-compliant node device 150F' to form the second mesh network 115'. For example, the administration device 140 may prevent the non-compliant node device 150F' and the subset of node devices 150 associated with the non-compliant node device 150F' from communicating with the other remaining node devices 150 of the mesh network 115'.

Referring to the example of FIG. 3, the administration device 140 may block communication between node device 150F' and node device 150I, communication between node device 150A and node devices 150A and 150E, communication between node device 150J and node devices 150B and 150M, and/or communication between node device 150P and node device 150Q. It should be noted that the configuration of the various node devices 150 and communication paths illustrated in FIG. 3 are merely an example to aid in understanding the inventive concepts.

As illustrated in FIG. 3, the non-compliant node device 150F' and the subset of node devices 150 associated with the non-compliant node device 150F' may be restricted from communicating with other node devices 150 in other portion of the updated mesh network 115' (e.g., those node devices 150 not associated with the non-compliant node device 150F'). By isolating the non-compliant node device 150F' and the subset of node devices 150 associated with the non-compliant node device 150F', the administration device 140 may attempt to isolate those node devices 150 having a common feature and, potentially, a common vulnerability. The selection of the subset of node devices 150 associated with the non-compliant node device 150F' may be performed as an attempt to quarantine those node devices 150 that may have been infected and/or impacted by the non-compliant node device 150F'. Thus, according to some embodiments of the present disclosure, node devices 150 that have not yet been indicated as being compromised may still be isolated within the second (updated) mesh network 115'.

Referring to FIGS. 1 to 3, the network disruption may be accomplished in a number of ways. For example, as described with respect to FIG. 1, the communication path between the node devices 150 may be disrupted by altering the cryptographic state of those node devices 150 that are not part of the non-compliant node device 150' and the subset of node devices 150 associated with the non-compliant node device 150'. For brevity of description, the node devices 150 that are not the non-compliant node device 150F' and are not part of the subset of node devices 150 associated with the non-compliant node device 150F' shall be referred to as "compliant node devices" 150.

For example, the administration device 140 may transmit a configuration transmission 169 (see FIG. 1) to the compliant node devices 150. The configuration transmission 169 may instruct the compliant node devices 150 to iterate and/or regenerate their keys 194. By changing the keys 194, the compliant node devices 150 will continue communicating using a cryptographic key 194 that is different from that of the non-compliant node device 150' and the subset of node devices 150 associated with the non-compliant node device 150'. As a result, the messages between the compliant node devices 150 may be unintelligible to the non-compliant node device 150' and the subset of node devices 150 associated with the non-compliant node device 150'.

Utilizing the structure of FIG. 2 as an example, the administration device 140 may send a configuration transmission 169 (see FIG. 1) to node devices 150A, 150B, 150C, 150D, 150J, 150K, 150L, 150M, 150P, 150N, and 150Q so as to form the second mesh network 115'.

In some embodiments, the administration device 140 may transmit a configuration transmission 169 (see FIG. 1) to the compliant node devices 150 that contains a new seed 192 from which to generate a key 194. This configuration change may have the same result as iterating the key 194 previously described. However, the transmission of the new seed 192 may prevent a potentially hacked node device 150' from iterating the key 194 itself once it realizes that it cannot decrypt the incoming network communications from the other node devices 150.

Though some embodiments previously discussed describe the use of cryptographic alterations to disrupt the communications of the non-compliant node device 150' and the subset of node devices 150 associated with the non-compliant node device 150', the embodiments of the present disclosure are not limited thereto. In some embodiments, other network mechanisms may be used to disrupt the communications to the non-compliant node device 150' and the subset of node devices 150 associated with the non-compliant node device 150'. For example, firewall rules may be put in place within the network 110 (see FIG. 1) to block transmissions to the non-compliant node device 150' and the subset of node devices 150 associated with the non-compliant node device 150'. In some embodiments, IP addresses or other network addresses (e.g., a MAC addresses) associated with the non-compliant node device 150' and the subset of node devices 150 associated with the non-compliant node device 150' may be removed from broadcast lists or other service providers within the mesh network 115.

Some of the mechanisms previously described are able to disrupt the communications of the non-compliant node device 150' and the subset of node devices 150 associated with the non-compliant node device 150' without directly accessing and/or actively involving the participation of the node devices 150 themselves. This can be useful, as the non-compliant node device 150' and the subset of node devices 150 associated with the non-compliant node device 150' are presumed initially to be compromised, such that they cannot be trusted to necessarily voluntarily remove themselves from the mesh network 115. However, the embodiments of the present disclosure are not limited to such techniques. In some embodiments, hardware-based solutions may be used to disrupt the communications of the non-compliant node device 150' and the subset of node devices 150 associated with the non-compliant node device 150'. For example, the network interface 180 (see FIG. 1) of the non-compliant node device 150' and the subset of node devices 150 associated with the non-compliant node device 150' may be disabled (e.g., at a firmware level) by the administration device 140.

In some embodiments, the identification of the non-compliant node device 150' and the subset of node devices 150 associated with the non-compliant node device 150', as well as the disruption of the communication thereof, may be a later step in an escalating series of steps. For example, the administration device 140 may detect a non-compliance with a non-compliant node device 150' (e.g., a down-level software package) and may first send a transmission to the non-compliant node device 150' to request that the software package be updated. The disruption to the communication of the non-compliant node device 150', as well as the disruption of the communication of the subset of node devices 150 associated with the non-compliant node device 150', may occur after a threshold amount of time has passed without the problem/non-compliance being corrected.

In some embodiments, once the non-compliant node device 150' and the subset of node devices 150 associated with the non-compliant node device 150' are isolated from the network, they may be analyzed to determine if they have been compromised. For example, the administration device 140 may first analyze the subset of node devices 150 associated with the non-compliant node device 150' to determine if they truly have been compromised. This may involve analyzing logs and/or performance of the subset of node devices 150 associated with the non-compliant node device 150'. When one of the subset of the node devices 150 associated the non-compliant node device 150' is determined to be non-compromised, it may have its access to the mesh network 115 re-established. For example, the node device 150 may be instructed to iterate its key 194 or may be given an updated seed 192 to match the other node devices of the mesh network 115.

In some embodiments, the non-compliant node device 150' may be the last to be analyzed. If an update to the non-compliant node device 150' is needed (e.g., a software update), the administration device 140 may establish a separate private network between the administration device 140 (or some other update server) and the non-compliant node device 150'. This may allow the non-compliant node device 150' to be updated without exposing the rest of the mesh network 115 to a potential threat. If the non-compliant node device 150' cannot be made to be in compliance with the policy 138, the non-compliant node device 150' may be permanently excluded from the mesh network 115 and/or physically disabled (e.g., powered off). In some embodiments, if the non-compliant node device 150' can be made to be in compliance with the policy 138, it may be readmitted to the mesh network 115. In such a scenario, the administration device 140 may monitor the non-compliant node device 150' more frequently for a defined period of time. In some embodiments, a service and/or functionality being provided by the non-compliant node device 150' may be transitioned to other node device 150 within the mesh network 115.

Figure 4:
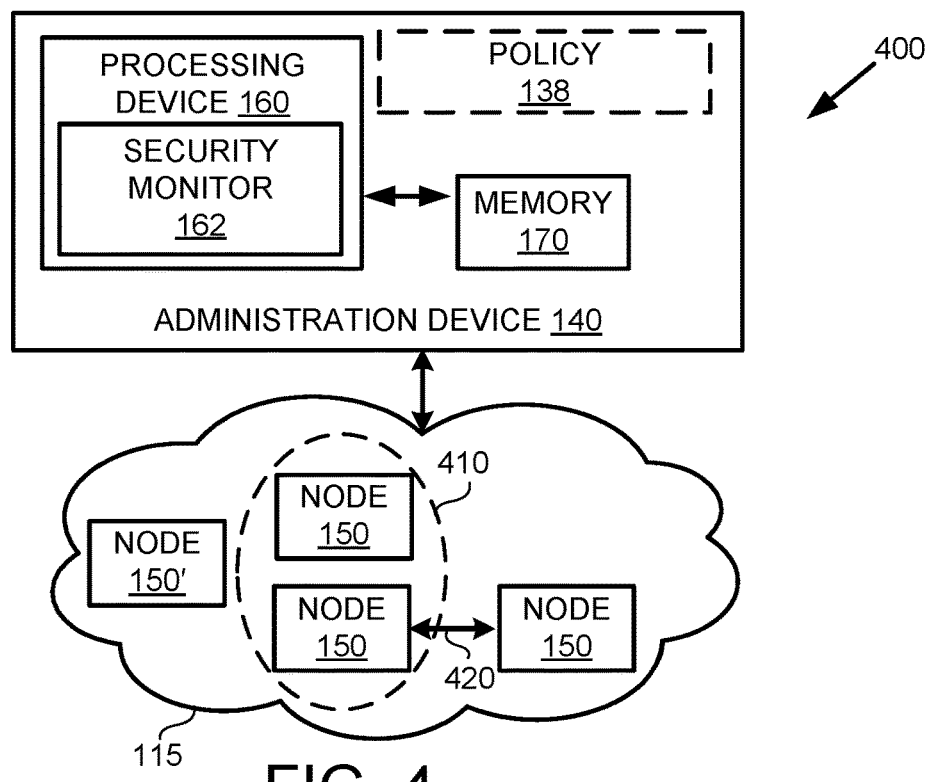
FIG. 4 is a component diagram of an example of a device architecture, in accordance with one or more aspects of the disclosure.

FIG. 4 is a component diagram of an example of a device architecture 400, in accordance with one or more aspects of the disclosure. The device architecture 400 includes administration device 140, processing device 160, and memory 170 of FIG. 1 and, as such, a duplicate description thereof will be omitted.

A security monitor 162 of the administration device 140 may analyze a security configuration of a plurality of node devices 150 described herein with respect to FIGS. 1-3. The administration device 140 may compare, e.g., by the processing device 160, the configuration of the node devices 150 to one or more network policies 138 for a mesh network 115.

The administration device 140 may determine (e.g., by the security monitor 162) that one of the node devices 150 is a non-compliant node device 150' due to being out of compliance with the network policy 138. The administration device 140 may further identify a subset 410 of the plurality of node devices 150 that are associated with the non-compliant node device 150'. The subset 410 of node devices 150 may be associated based on a physical proximity to the non-compliant node device 150', based on a logical proximity of the non-compliant node device 150', and/or based on sharing a common feature with the non-compliant node device 150'. It should be noted that the network policy 138 is shown for illustrative purposes only and is not physical components of administration device 140.

The administration device 140 may disrupt a communication path 420 of the non-compliant node device 150' and the subset 410 of the plurality of node devices 150 that are associated with the non-compliant node device 150'. For example, the communication path 420 may be between the subset 410 of the plurality of node devices 150 that are associated with the non-compliant node device 150' and other node devices 150 of the mesh network 115 (e.g., node devices 150 of the mesh network 115 that are not within the physical proximity to the non-compliant node device 150', not within the logical proximity of the non-compliant node device 150', and/or not sharing the common feature with the non-compliant node device 150').

Administration device 140 may include a memory 170 that is operatively coupled to processing device 160. In some embodiments, memory 170 may include volatile memory devices (e.g., random access memory (RAM)), non-volatile memory devices (e.g., flash memory) and/or other types of memory devices.

Figure 5:
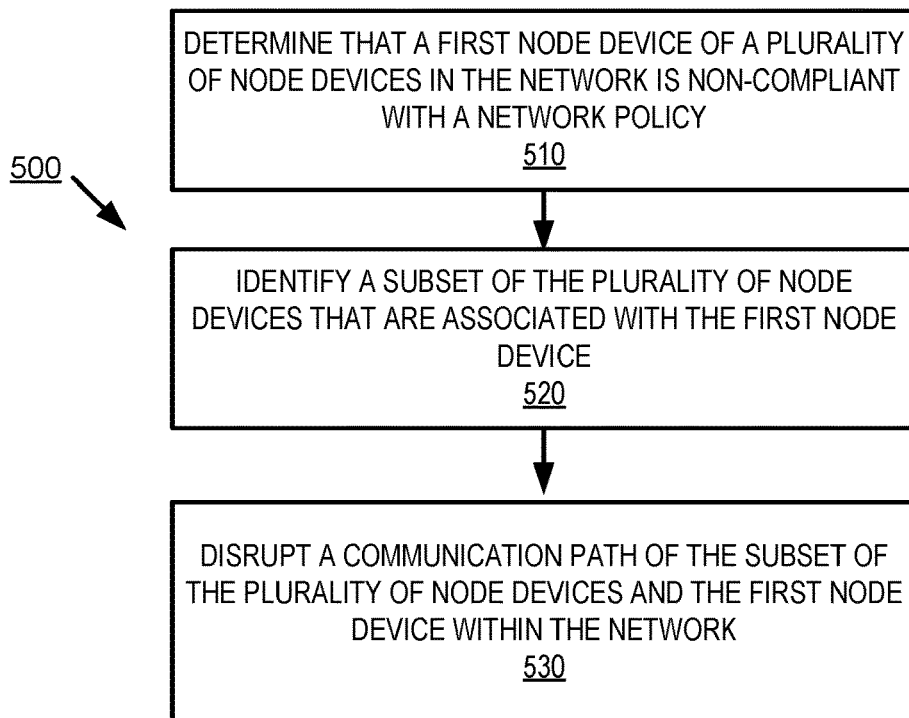
FIG. 5 is a flow diagram of a method of monitoring a security configuration of a mesh network, in accordance with one or more aspects of the disclosure.

FIG. 5 is a flow diagram of a method 500 of monitoring a security configuration of a mesh network 115, in accordance with one or more aspects of the disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by administration device 140 and/or the security monitor 162 of at least FIG. 1.

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic determines that a first node device of a plurality of node devices in the network is non-compliant with a network policy. The plurality of node devices may be, for example, similar to the node devices 150 discussed herein with respect to FIGS. 1-4. The network and network policy may be, for example, similar to mesh network 115 and policy 138 discussed herein with respect to FIGS. 1-4. The first node device that is non-compliant with the network policy may be similar to the non-compliant node device 150', 150F' discussed herein with respect to FIGS. 1-4.

At block 520, the processing logic, identifies a subset of the plurality of node devices that are associated with the first node device. The subset of the plurality of node devices may be, for example, similar to the subset 410 of the node devices 150 that are determined to be associated with the non-compliant node device 150', 150F' discussed herein with respect to FIGS. 1-4. In some embodiments, the subset of the plurality of node devices share a common feature with the first node device. For example, the subset of the plurality of node devices may provide a same or similar service to the network as the first node device. In some embodiments, the subset of the plurality of node devices includes node devices within a threshold number of network connections from the first node device.

At block 530, the processing logic, disrupts a communication path of the subset of the plurality of node devices and the first node device within the network. The communication path may be, for example, similar to the communication path 420 and network paths discussed herein with respect to FIGS. 1-4. In some embodiments, the disruption of the communication path of the subset of the plurality of node devices and the first node device may be performed without directly accessing the subset of the plurality of node devices. In some embodiments, disrupting the communication path of the subset of the plurality of node devices and the first node device may be performed by altering a cryptographic key utilized by the communication path. In some embodiments, disrupting the communication path of the subset of the plurality of node devices and the first node device is performed by altering a seed used to generate a cryptographic key utilized by the communication path.

Figure 6:
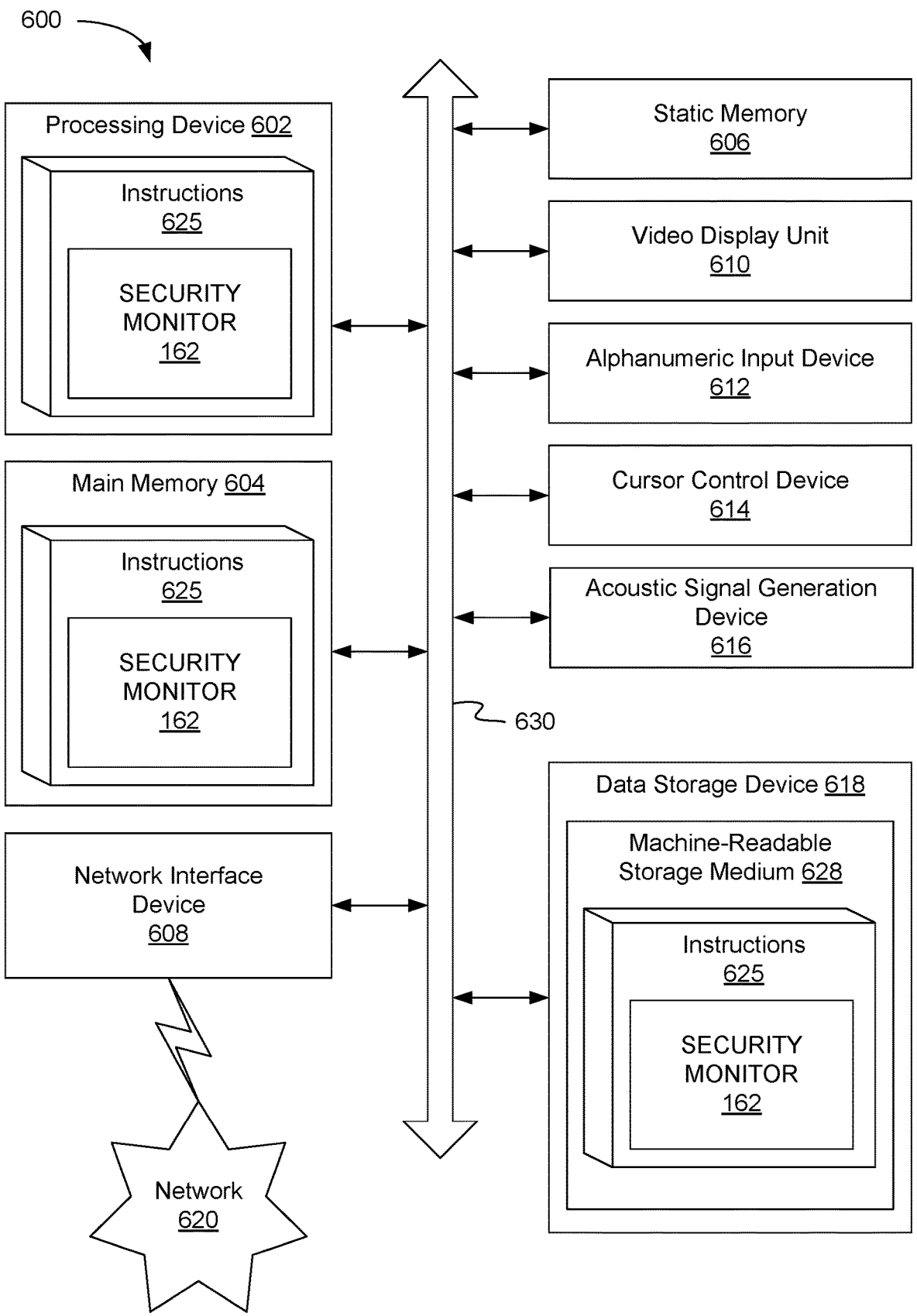
FIG. 6 is a block diagram of an example apparatus that may perform one or more of the operations described herein, in accordance with one or more aspects of the disclosure.

FIG. 6 is a block diagram of an example computing device 600 that may perform one or more of the operations described herein, in accordance with one or more aspects of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD)

or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a service configuration component, e.g., security monitor 162 for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "determining," "identifying," "disrupting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    determining, by an administration device of a network, that a first node device of a plurality of node devices in the network is non-compliant with a network policy, the first node device being arranged in a zone of the network;
    identifying, by a processor of the administration device, a first subset of the plurality of node devices that are outside the zone;
    transmitting, from the administration device to the first subset of the plurality of node devices, an instruction to alter a state of a communication path of the first subset of the plurality of node devices to be incompatible with the first node device, wherein the instruction includes an updated seed that causes the first subset of the plurality of node devices to generate an updated cryptographic key.

2. The method of claim 1, wherein the instruction causes an alteration of a first cryptographic state of the first subset of the plurality of node devices to be incompatible with a second cryptographic state of the first node device.

3. The method of claim 2, wherein the updated cryptographic key causes the alteration of the first cryptographic state of the first subset of the plurality of node devices to be incompatible with the second cryptographic state of the first node device.

4. The method of claim 1, further comprising:
    identifying, by the processor of the administration device, a second subset of the plurality of node devices that are arranged within the zone, wherein the instruction causes the communication path to be incompatible with the second subset of the plurality of node devices.

5. The method of claim 4, wherein identifying, by the processor of the administration device, the second subset of the plurality of node devices comprises identifying the second subset of the plurality of node devices based on at least one of a geographic proximity or a network proximity of the second subset of the plurality of node devices to the first node device.

6. The method of claim 1, wherein the instruction causes the first subset of the plurality of node devices to alter the state of the communication path without directly accessing the first node device.

7. A system comprising:
    a memory; and
    a processor, operatively coupled to the memory, to:
        determine that a first node device of a plurality of node devices in a network is non-compliant with a network policy, the first node device being arranged in a zone of the network;
        identify a first subset of the plurality of node devices that are outside the zone; and
        transmit, to the first subset of the plurality of node devices, an instruction to alter a state of a communication path of the first subset of the plurality of node devices to be incompatible with the first node device, wherein the instruction includes an updated seed that causes the first subset of the plurality of node devices to generate an updated cryptographic key.

8. The system of claim 7, wherein the instruction causes an alteration of a first cryptographic state of the first subset of the plurality of node devices to be incompatible with a second cryptographic state of the first node device.

9. The system of claim 8, wherein the updated cryptographic key causes the alteration of the first cryptographic state of the first subset of the plurality of node devices to be incompatible with the second cryptographic state of the first node device.

10. The system of claim 7, wherein the processor is further to:
    identify a second subset of the plurality of node devices that are arranged within the zone, wherein the instruction causes the communication path to be incompatible with the second subset of the plurality of node devices.

11. The system of claim 10, wherein the processor is to identify the second subset of the plurality of node devices based on at least one of a geographic proximity or a network proximity of the second subset of the plurality of node devices to the first node device.

12. The system of claim 7, wherein the plurality of node devices form a mesh network.

13. A non-transitory computer-readable storage medium including instructions that, when executed by a processor, cause the processor to:
    determine that a first node device of a plurality of node devices in a network is non-compliant with a network policy, the first node device being arranged in a zone of the network;
    identify, by the processor, a first subset of the plurality of node devices that are outside the zone; and
    transmit, to the first subset of the plurality of node devices, a configuration to alter a state of a communication path of the first subset of the plurality of node devices to be incompatible with the first node device, wherein the configuration includes an updated seed that causes the first subset of the plurality of node devices to generate an updated cryptographic key.

14. The non-transitory computer-readable storage medium of claim 13, wherein the configuration causes an alteration of a first cryptographic state of the first subset of the plurality of node devices to be incompatible with a second cryptographic state of the first node device.

15. The non-transitory computer-readable storage medium of claim 14, wherein the updated cryptographic key causes the alteration of the first cryptographic state of the first subset of the plurality of node devices to be incompatible with the second cryptographic state of the first node device.

16. The non-transitory computer-readable storage medium of claim 13, wherein instructions cause the processor further to:
    identify a second subset of the plurality of node devices that are arranged within the zone, wherein the configuration causes the communication path to be incompatible with the second subset of the plurality of node devices.

17. The non-transitory computer-readable storage medium of claim 16, wherein the instructions cause the processor to identify the second subset of the plurality of node devices based on at least one of a geographic proximity or a network proximity of the second subset of the plurality of node devices to the first node device.

\* \* \* \* \*